(12) United States Patent
Huang et al.

(10) Patent No.: US 11,777,626 B2
(45) Date of Patent: Oct. 3, 2023

(54) METHOD AND APPARATUS RELATED TO MULTIPLE MODES

(71) Applicant: XRSPACE CO., LTD., Taoyuan (TW)

(72) Inventors: Ching-Ning Huang, Taipei (TW); Chien-Chih Hsu, Changhua County (TW)

(73) Assignee: XRSPACE CO., LTD., Taoyuan (TW)

( * ) Notice: Subject to any disclaimer, the term of this patent is extended or adjusted under 35 U.S.C. 154(b) by 552 days.

(21) Appl. No.: 17/115,819

(22) Filed: Dec. 9, 2020

(65) Prior Publication Data

US 2022/0182162 A1 Jun. 9, 2022

(51) Int. Cl.
*G01S 19/49* (2010.01)
*H04H 20/86* (2008.01)
*H04H 60/70* (2008.01)
*G06V 20/00* (2022.01)

(52) U.S. Cl.
CPC ............ *H04H 20/86* (2013.01); *G01S 19/49* (2013.01); *G06V 20/00* (2022.01); *H04H 60/70* (2013.01)

(58) Field of Classification Search
CPC ........ H04H 20/86; H04H 60/70; G06V 20/00; G01S 19/49
See application file for complete search history.

(56) References Cited

U.S. PATENT DOCUMENTS

| 2017/0192494 | A1 | 7/2017 | Niranjan et al. |
| 2017/0282062 | A1 | 10/2017 | Black |
| 2020/0059502 | A1 | 2/2020 | Iyer et al. |

FOREIGN PATENT DOCUMENTS

| CN | 206629278 | 11/2017 |
| TW | 201923719 | 6/2019 |

OTHER PUBLICATIONS

"Search Report of Europe Counterpart Application", dated May 28, 2021, p. 1-p. 10.

*Primary Examiner* — Mathew Franklin Gordon
(74) *Attorney, Agent, or Firm* — JCIP GLOBAL INC.

(57) ABSTRACT

A method and an apparatus related to multiple modes are provided. In the method, the first mode is operated. The first mode is a host mode or a client mode, and the host mode is configured for broadcasting information related to a global coordinate system to a device operated with the client mode. A switching condition is detected, and the first mode is switched to the second mode. The second mode is another one of the host mode and the client mode. The second mode is operated. Therefore, the positioning information of a global coordinate system can be provided for motion sensing apparatuses.

20 Claims, 3 Drawing Sheets

METHOD AND APPARATUS RELATED TO MULTIPLE MODES

BACKGROUND OF THE DISCLOSURE

1. Field of the Disclosure

The present disclosure generally relates to a mode controlling mechanism, in particular, to a method and an apparatus related to multiple modes.

2. Description of Related Art

Some electronic apparatuses may allow human body portions (such as hands, legs, head, etc.) of the user to control the operation of these electronic apparatuses, and the motion of these human body portions may be tracked. For example, a virtual reality (VR) product may provide a handheld controller, and the handheld controller includes an inertial measurement unit (IMU) to track the motion of the hands of the user. The detected motion of the human body portion may be further used for positioning the human body portion. The position information based on the IMU is merely used for a local coordinate system. However, the position information of the local coordinate system may not be related to the real environment and may not be used for another application related to the interaction with other objects in the real environment.

SUMMARY OF THE DISCLOSURE

Accordingly, the present disclosure is directed to a method and an apparatus related to multiple modes, to further provide positioning information of a global coordinate system.

In one of the exemplary embodiments, a method, includes, but is not limited thereto, the following steps. The first mode is operated. The first mode is a host mode or a client mode, and the host mode is configured for broadcasting information related to a global coordinate system to others operated with the client mode. A switching condition is detected, and the first mode is switched to the second mode. The second mode is another one of the host mode and the client mode. The second mode is operated.

In one of the exemplary embodiments, an apparatus, includes, but is not limited thereto, a communication transceiver, a memory, and a processor. The memory is used for storing program code. The processor is coupled to the memory and the communication transceiver. The processor is configured for loading and executing the program code to perform the following steps. The first mode is operated. The first mode is a host mode or a client mode, and the host mode is configured for broadcasting information related to a global coordinate system to others operated with the client mode. A switching condition is detected, and the first mode is switched to the second mode. The second mode is another one of the host mode and the client mode. The second mode is operated.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
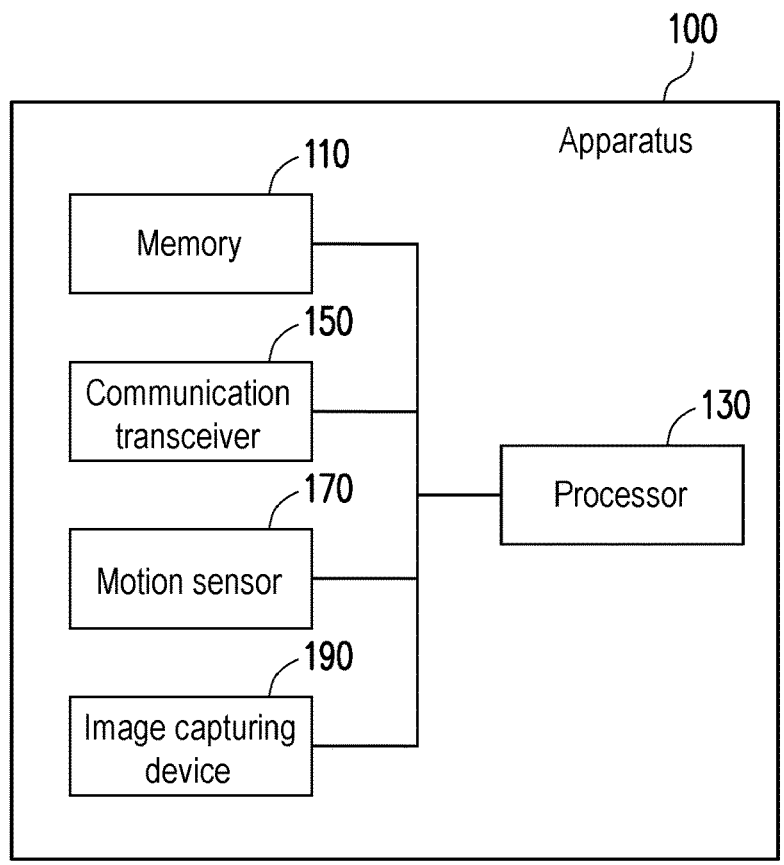
FIG. 1 is a block diagram illustrating an apparatus according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating an apparatus 100 according to one of the exemplary embodiments of the disclosure. Referring to FIG. 1, the apparatus 100 includes, but is not limited thereto, a memory 110, a processor 130, a communication transceiver 150, and a motion sensor 170. In one embodiment, the apparatuses 100 could be a handheld controller or a wearable apparatus, such as a wearable controller, a smartwatch, an ankle sensor, a waist belt, a head-mounted display (HMD), or the likes. In one embodiment, the apparatuses 100 is wearable on one human body portion of the user. The human body portion may be hand, head, ankle, leg, waist, or other portions. In some embodiments, the apparatus 100 is adapted for XR or other reality related technologies.

The memory 110 may be any type of a fixed or movable random-access memory (RAM), a read-only memory (ROM), a flash memory, a similar device, or a combination of the above devices. In one embodiment, the memory 110 records program codes, device configurations, buffer data, or permanent data (such as position information, movement status, or external information), and these data would be introduced later.

The processor 130 is coupled to the memory 110. The processor 130 is configured to load the program codes stored in the memory 110, to perform a procedure of the exemplary embodiment of the disclosure.

In some embodiments, the processor 130 may be a central processing unit (CPU), a microprocessor, a microcontroller, a graphics processing unit (GPU), a digital signal processing (DSP) chip, a field-programmable gate array (FPGA). The functions of the processor 150 may also be implemented by an independent electronic device or an integrated circuit (IC), and operations of the processor 130 may also be implemented by software.

The communication transceiver 150 is coupled to the processor 130. The communication transceiver 150 could be compatible with Bluetooth, Wi-Fi, IR, RFID, or other wireless communication technologies. In one embodiment, the communication transceiver 150 is used for transmitting and/or receiving wireless signals with other apparatuses 100.

The motion sensor 170 is coupled to the processor 130. The motion sensor 170 may be an accelerometer, a gyroscope, a magnetometer, an inertial measurement unit (IMU), or any combination of the aforementioned sensors. In one embodiment, the motion sensor 170 is used for sensing the motion of a corresponding human body portion of the user, which wears the apparatus 100, for a period, to generate a sequence of sensing data from the sensing result (such as acceleration, rotation, magnetic force, etc.) of the motion sensor 170 at multiple time points within the period. For one example, the sensing data includes a 3-degree of freedom (3-DoF) data, and the 3-DoF data which are related to the orientation information of the human body portion in three-dimensional (3D) space, such as accelerations in yaw, roll, and pitch.

In one embodiment, the apparatus 100 further includes an image capturing device 190. The image capturing device 190 could be a camera, such as a monochrome camera or a color camera, a deep camera, a video recorder, or other image capturing devices capable of capturing images. In one embodiment, the image capturing device 190 is disposed at the main body of the apparatus 100 to capture outside. For example, when a user wears the apparatus 100, the image capturing device 190 may be at the position in front of the eyes of the user.

In one embodiment, an HMD or digital glasses includes the memory 110, the processor 130, the communication transceiver 150, and the image capturing device 190. In some embodiments, the processor 130 may not be disposed in the same apparatus with the communication transceiver 150 and/or the image capturing device 190. However, the apparatuses respectively equipped with the processor 130, the communication transceiver 150, and the image capturing device 190 may further include communication transceivers with compatible communication technology, such as Bluetooth, Wi-Fi, and IR wireless communications, or physical transmission line, to transmit or receive data with each other. For example, the processor 130 may be installed in an HMD while the image capturing device 190 is located outside the HMD. For another example, the processor 130 may be installed in a computing device, and the display 120 is disposed outside the computing device.

To better understand the operating process provided in one or more embodiments of the disclosure, several embodiments will be exemplified below to elaborate the apparatus 100. The devices and modules in apparatus 100 are applied in the following embodiments to explain the method related to multiple modes provided herein. Each step of the method can be adjusted according to actual implementation situations and should not be limited to what is described herein.

Figure 2:
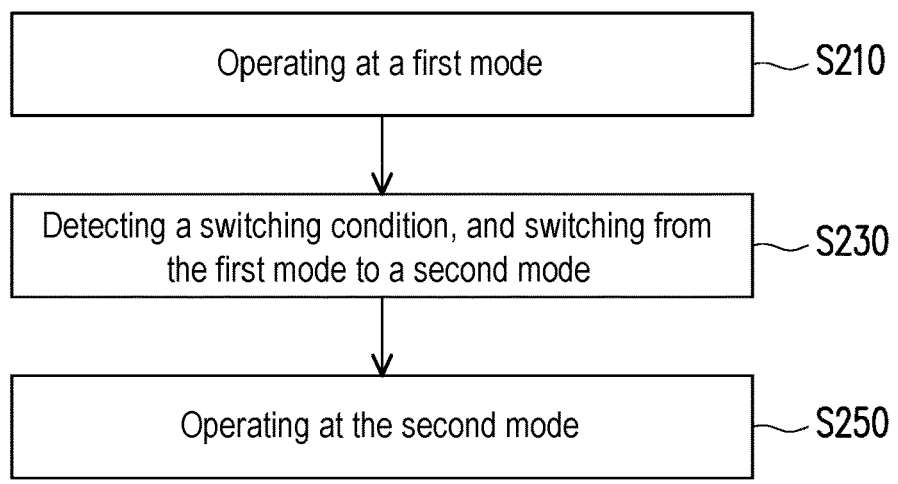
FIG. 2 is a flowchart illustrating a method according to one of the exemplary embodiments of the disclosure.

FIG. 2 is a flowchart illustrating a method according to one of the exemplary embodiments of the disclosure. Referring to FIG. 2, the processor 130 may operate at a first mode by the communication transceiver 150 (step S210). Specifically, the first mode is one of a host mode and a client mode. The host mode is configured for broadcasting, by the communication transceiver 150, information related to a global coordinate system to others (such as the apparatus 100 or other devices) operated with the client mode. The apparatus 100 or another device operated at the client mode may use the received information or the received signal strength to determine the position information of the global coordinate system. Furthermore, the global coordinate system is a coordinate system corresponding to a real environment. For example, a three-dimensional coordinate system of an architectural space.

In one embodiment, the host mode is configured as a Beacon station, and the client mode is configured as a Beacon receiver. The Beacon station may broadcast a message including its identifier. The Beacon receiver may receive the message, and use the received strength (such as received signal strength indication (RSSI), received channel power indicator (RCPI), or reference signal received power (RSRP)) of the signal to determine the distance relative to the Beacon station. Based on trilateration, three distances between three points can be used to determine the relative position information of the three points. It is assumed that three of the apparatuses 100 (including one or more Beacon stations and one or more Beacon receivers) as the aforementioned three points, the processor 130 may determine the relative distances between every two apparatuses 100 as the distance relationship between the apparatuses 100. Then, the processor 130 may generate the position information of the tracked apparatus in the global coordinate system based on the distance relationship and trilateration.

It should be noticed that Beacon is a broadcast protocol based on Bluetooth. However, in other embodiments, the apparatus 100 operated at the host mode may broadcast based on Wi-Fi, ZigBee, or other wireless communication.

In one embodiment, in the host mode, the processor 130 may configure as an original point in the global coordinate system. For example, the apparatus 100 may configure its coordinates as (0, 0, 0) in the global coordinate system. The processor 130 may further broadcast information related to the original point by the communication transceiver 150. The information may be the coordinates or a tag labeled as the original point.

In one embodiment, in the host mode, the processor 130 may configure that the original point is located at a real object in a real environment. The real object could be the wall, the floor, or the table. The real object is used for a relation between the global coordinate system and the real environment. Those apparatuses 100 or other devices operating at the client mode may know the position relative to the real object based on the relation.

In one embodiment, the type of the real object is predefined. For example, the real object is a table, and the user should put the apparatus 100 operated at the host mode on the table.

In another embodiment, the type of the real object is selected by the user. For example, the user may put the apparatus 100 operated at the host mode on the wall, then select the real object as the wall on the user interface displayed on the display.

In some embodiments, the processor 130 may identify the real object based on an image captured by the image capturing device 190 in the real environment. For example, one apparatus 100 equipped with image capturing device 190 may identify another apparatus 100 operated at the host mode in the image based on the object identification algorithm (such as machine learning-based inference or image feature comparison). The apparatus 100 may further identify the real object where the apparatus 100 operated at the host mode is located, to determine the type of the real object.

It should be noticed that without any apparatus 100 or another device operating at the host mode, those apparatuses 100 operating at the client mode, may merely use the detecting result of the motion sensor 170 to determine the position information of the local coordinate system. For example, a 6-DoF sensor may be used to obtain the position and the rotation information of the apparatus 100. The rotation information may be estimated according to the acceleration, the rotation, and the magnetic force obtained by the sensor. Then, a displacement of the apparatus 100 can be estimated through double integral on the detected acceleration.

However, the position information of the local coordinate system may not be related to the real environment or other systems (such as other users' HMD system). For example, a HMD system includes an HMD and a handheld controller. This HMD system would have its local coordinate system. However, this local coordinate system may not be adapted for another unpaired handheld controller or another HMD system.

In some embodiments, in the host mode, based on the broadcast mechanism, the processor 130 may further transmit external information by the communication transceiver 150. The external information may be related to message forwarding and/or proximity alarm. For example, regarding the message forwarding, the message may include or relate to text, image, voice, and/or video. Another apparatus 100 or device operating at the client mode may decode the message and obtain further information, such as another detailed message. Regarding the proximity alarm, if an HMD operating at the client mode approaches to a handheld controller operating at the host mode, the HMD may receive the external information. Then, an effect such as an animation or a notification may be displayed on the display of the HMD. Alternatively, a warning tone of an alarm may sound.

On the other hand, in one embodiment, in the client mode, as mentioned above, the processor 130 may receive the broadcast message from another apparatus 100 operating at the host mode by the communication transceiver 150. The broadcast message may be used for positioning, message forwarding, or proximity alarm.

In some embodiments, in the client mode, the processor 130 may further track inertial measurement related information by the motion sensor 170. The inertial measurement related information could be acceleration, rotation, 3-DoF, or 6-DoF information.

The processor 130 may detect a switching condition and switch from the first mode to a second mode based on the detected result of the switching condition (step S230). Specifically, the second mode is another one of the host mode and the client mode. That is the second mode is different from the first mode. For example, the first mode is the client mode, and the second mode is the host mode. Alternatively, the first mode is the host mode, and the second mode is the client mode.

In one embodiment, the processor 130 may determine a movement status based on the detecting result of the motion sensor 170. The movement status could be a moving status or a stationary status. The switching condition between modes is that one of the moving status and the stationary status is detected. The moving status may be the situation that the displacement and/or the rotation of the apparatus 100 exceeds a tolerance range. For example, a user wears the apparatus 100 and walks, then the moving status may be detected. On the other hand, the stationary status may be the situation that the displacement and/or the rotation of the apparatus 100 does not exceed the tolerance range. For example, the user puts the apparatus 100 on the floor, and the stationary status may be detected.

In one embodiment, the host mode corresponds to the stationary status, and the client mode corresponds to the moving status. If the movement status of apparatus 100 is the stationary status, the client mode (i.e., the first mode) would switch to the host mode (i.e., the second mode). On the other hand, if the movement status of apparatus 100 is the moving status, the host mode (i.e., the first mode) would switch to the client mode (i.e., the second mode).

After the mode is changed, the processor 130 may operate at the second mode by the communication transceiver 150 (step S250). Specifically, as mentioned in step S210, if the second mode is the host mode, the apparatus 100 may broadcast information. If the second mode is the client mode, the apparatus 100 may receive the broadcasted information and obtain inertial measurement related information.

In one embodiment, in the host mode, the processor 130 may further stop obtaining the inertial measurement related information by the motion sensor 170. The apparatus 100 operating at the host mode would be considered as a position reference, for example, the original point. Any movement of the apparatus operating at the host mode may affect the stability of the positioning in the global coordinate system. Therefore, the movement status of the apparatus 100 would be the stationary status, and there is no need to further detect the motion of the apparatus 100 all the time. However, in order to determine whether the movement status is changed, the inertial measurement related information may be detected periodically. In some embodiments, the processor 130 may merely ignore the inertial measurement related information during the host mode.

Figure 3:
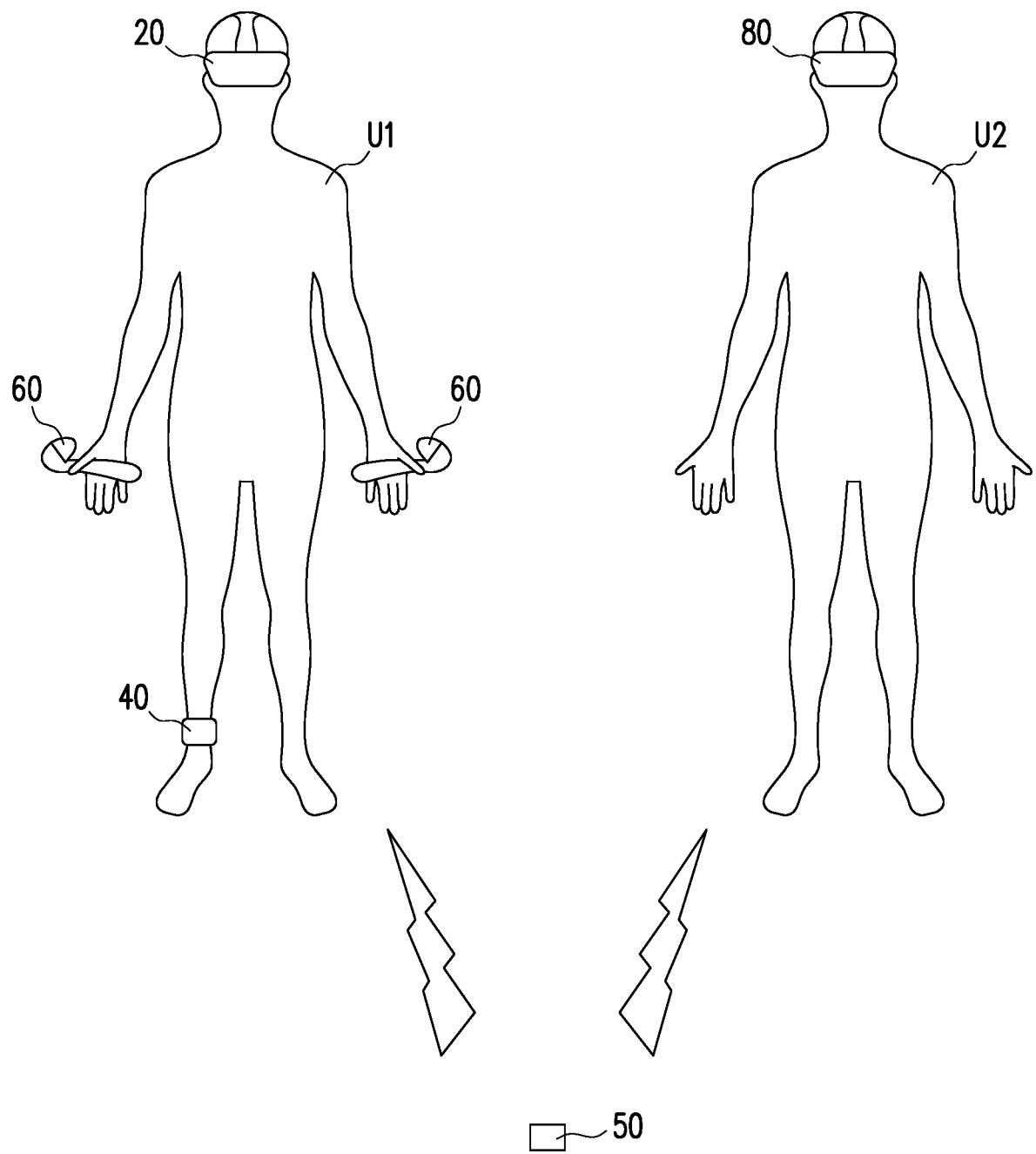
FIG. 3 is a schematic diagram illustrating a positioning system according to one of the exemplary embodiments of the disclosure.

For example, FIG. 3 is a schematic diagram illustrating a positioning system according to one of the exemplary embodiments of the disclosure. Referring to referring to FIG. 3, the apparatus 100 could be HMDs 20, 80, ankle sensors 40, 50, or handheld controller 60. The HMDs 20, 80, the ankle sensor 40, and handheld controller 60 is operated at the client mode. The ankle sensor 50 is operated at the host mode. Therefore, the ankle sensor 50 may broadcast information related to the global coordinate system, and the HMDs 20, 80, the ankle sensor 40, and handheld controller 60 may use the received signal strength to determine the position information in the global coordinate system. It should be noticed that the HMD 20 worn by user U1 or the ankle sensor 50 may know the relative position of the HMD 80 worn by the user U2 in the global coordinate system. If two HMDs 20 and 80 are too close, for example, the distance between two HMDs 20 and 80 is less than 1 meter, the proximity alarm may be generated. However, without the ankle sensor 50 operating at the host mode, the HMD 20 may not know the relative position of the HMD 80.

In one embodiment, in the client mode, the processor 130 may further stop broadcasting the information related to the global coordinate system. One apparatus 100, which broadcasts the information, is used to become a position reference. However, in the client mode, the apparatus 100 may be worn by a user to detect the motion of the human body portion.

Figure 4:
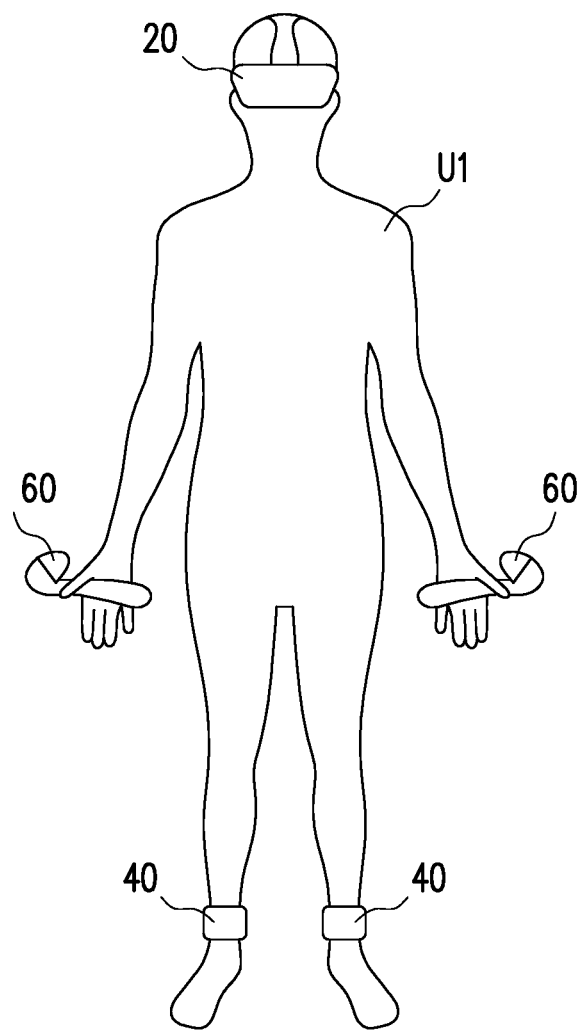
FIG. 4 is a schematic diagram illustrating a motion tracking system according to one of the exemplary embodiments of the disclosure.

For example, FIG. 4 is a schematic diagram illustrating a motion tracking system according to one of the exemplary embodiments of the disclosure. Referring to FIG. 4, compared with the embodiment, the user U1 further wears the ankle sensor 40. Therefore, the motion of the hands, the head, and the ankles of the user U1 can be tracked.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method, comprising:
 operating at a first mode, wherein the first mode is one of a host mode and a client mode, and the host mode is configured for broadcasting information related to a global coordinate system to others operated with the client mode;
 detecting a switching condition, and switching from the first mode to a second mode based on a detected result of the switching condition, wherein the second mode is another one of the host mode and the client mode; and
 operating at the second mode.

2. The method according to claim 1, wherein the step of detecting the switching condition comprises:
  determining a movement status, wherein the movement status comprises a moving status and a stationary status, and the switching condition is that one of the moving status and the stationary status is detected.

3. The method according to claim 2, wherein the host mode corresponds to the stationary status, and the client mode corresponds to the moving status.

4. The method according to claim 1, wherein the first mode is the host mode, and the step of operating at the first mode comprises:
  configuring as an original point in the global coordinate system; and
  broadcasting information related to the original point.

5. The method according to claim 4, further comprising:
  configuring the original point is located at a real object in a real environment, wherein the real object is used for a relation between the global coordinate system and the real environment.

6. The method according to claim 5, further comprising:
  identifying the real object based on an image captured in the real environment.

7. The method according to claim 1, wherein the host mode is configured as a Beacon station, and the client mode is configured as a Beacon receiver.

8. The method according to claim 7, wherein the first mode is the host mode, and the step of operating at the first mode further comprises:
  transmitting external information, wherein the external information is related to at least one of message forwarding and proximity alarm.

9. The method according to claim 7, wherein the first mode is the host mode, and the step of operating at the first mode further comprises:
  stopping obtaining inertial measurement related information.

10. The method according to claim 7, wherein the first mode is the client mode, and the step of operating at the first mode further comprises:
  tracking inertial measurement related information; and
  stopping broadcasting the information related to the global coordinate system.

11. An apparatus, comprising:
  a communication transceiver;
  a memory, storing program code; and
  a processor, coupled to the memory and the communication transceiver, configured to load and execute the program code to perform:
    operating, by the communication transceiver, at a first mode, wherein the first mode is one of a host mode and a client mode, the host mode is configured for broadcasting information related to a global coordinate system by the communication transceiver to others operated with the client mode;
    detecting a switching condition, and switching from the first mode to a second mode based on a detected result of the switching condition, wherein the second mode is another one of the host mode and the client mode; and
    operating, by the communication transceiver, at the second mode.

12. The apparatus according to claim 11, further comprising:
  a motion sensor, coupled to the processor, and detecting a motion of the apparatus, wherein the processor is further configured for:
    determining a movement status based on detecting result of the motion sensor, wherein the movement status comprises a moving status and a stationary status, and the switching condition is that one of the moving status and the stationary status is detected.

13. The apparatus according to claim 12, wherein the host mode corresponds to the stationary status, and the client mode corresponds to the moving status.

14. The apparatus according to claim 11, wherein the first mode is the host mode, and the processor is further configured for:
  configuring as an original point in the global coordinate system; and
  broadcasting, by the communication transceiver, information related to the original point.

15. The apparatus according to claim 14, wherein the processor is further configured for:
  configuring the original point is located at a real object in a real environment, wherein the real object is used for a relation between the global coordinate system and the real environment.

16. The apparatus according to claim 15, further comprising:
  an image capturing device, coupled to the processor, wherein the processor is further configured for:
    identifying the real object based on an image captured by the image capturing device in the real environment.

17. The apparatus according to claim 11, wherein the host mode is configured as a Beacon station, and the client mode is configured as a Beacon receiver.

18. The apparatus according to claim 17, wherein the first mode is the host mode, and the processor is further configured for:
  transmitting, by the communication transceiver, external information, wherein the external information is related to at least one of message forwarding and proximity alarm.

19. The apparatus according to claim 17, further comprising:
  a motion sensor, coupled to the processor, and detecting a motion of the apparatus, wherein the first mode is the host mode, and the processor is further configured for:
    stopping obtaining inertial measurement related information by the motion sensor.

20. The apparatus according to claim 17, further comprising:
  a motion sensor, coupled to the processor, and detecting a motion of the apparatus, wherein the first mode is the client mode, and the processor is further configured for:
    tracking inertial measurement related information by the motion sensor; and
    stopping broadcasting information related to the global coordinate system by the communication transceiver.

* * * * *